United States Patent [19]
Beschke et al.

[11] 3,899,495
[45] Aug. 12, 1975

[54] PROCESS FOR THE PRODUCTION OF 2,6-DICHLOROPYRIDINE

[75] Inventors: Helmut Beschke; Hans Schaefer, both of Grossauheim; Wilhelm Alfons Schuler, Bad Homburg, all of Germany

[73] Assignee: Deutsche Gold- und Silber-Scheideanstalt vormals Roessler, Germany

[22] Filed: Jan. 22, 1973

[21] Appl. No.: 325,834

[30] Foreign Application Priority Data
Feb. 21, 1972    Germany............................ 2208007

[52] U.S. Cl............................................. 260/290 HL
[51] Int. Cl............................................ C07d 31/26
[58] Field of Search..................................... 260/290

[56] References Cited
UNITED STATES PATENTS

| | | | |
|---|---|---|---|
| 2,820,791 | 1/1958 | Shermer | 260/290 |
| 3,251,848 | 5/1966 | Taplin | 260/290 |

*Primary Examiner*—Harry I. Moatz
*Attorney, Agent, or Firm*—Cushman, Darby & Cushman

[57] ABSTRACT

2,6-dichloropyridine is prepared from chlorine and pyridine at elevated temperatures in the presence of steam.

9 Claims, No Drawings

PROCESS FOR THE PRODUCTION OF 2,6-DICHLOROPYRIDINE

The invention is directed to an improved process for the production of 2,6-dichloropyridine.

2,6-dichloropyridine is an important intermediate product in the chemical industry.

It is known to react pyridine vapor and chlorine at 420°C. in the presence of granulated pumice. In this process, however, after a short time (3½ hours) the reaction tube was blocked by the carbon formed. In the reaction time the yield of 2,6-dichloropyridine is 34.8 percent based on the pyridine employed. As a by-product there was isolated 2-chloropyridine in a yield of 15.2 percent. The space-time-yield for 2,6-dichloropyridine was 38.2 grams per liter of reaction space per hour (J. P. Wibaut and J. R. Nicolai, Recueil trav. Chim. Pays-Bas Vol. 58 (1939) pages 709–721).

There is also known a process for chlorination of pyridine in the gas phase in the presence of an inert diluent between 200° and 550°C. in which silica is used as the catalyst. In this process there is formed a mixture of chlorination products with 2-chloropyridine and 2,6-dichloropyridine as the main constituents. No statement is made in regard to yields nor of the possibility of preferably obtaining the 2,6-dichloropyridine (British Pat. No. 1,050,378).

Finally there is known a process for the product of 2,6-dichloropyridine without using a catalyst wherein pyridine in the presence of a perchlorinated hydrocarbon vapor using a large excess of chlorine at 370° to 395°C. (Taplin U.S. Pat. No. 3,251,848). A disadvantage of this process is that a large excess of chlorine (about 5 moles or more than 200 percent) is required in case the 2,6-dichloropyridine is desired as the main product. Thus, in example 2 there were used 7.0 moles of chlorine for 1.1 mole of pyridine showed a yield of 87 percent of chloropyridines of which 75.5 mole percent was 2,6-dichloropyridine. Furthermore, the yields are unsatisfactory.

In contrast according to the present invention there is proposed a process for the production of 2,6-dichloropyridine from pyridine and chlorine at high temperatures is proposed which is characterized by carrying out the reaction in the presence of steam.

The process of the invention for example can be carried out as follows:

A pyridine-water mixture containing 5 to 20 moles of water per mole of pyridine, usually 8 to 14 moles of water per mole of pyridine is evaporated preheated to a temperature of 150° to 350°C., preferably 180° to 250°C., and introduced into the reaction vessel. There was also provided a chlorine gas stream which, for example, contained 2 to 3.5 moles of chlorine per mole of the pyridine. The chlorine stream was also preheated to a temperature of 200° to 380°C., preferably from 250° to 350°C. The chlorine gas stream was likewise introduced into the reaction vessel in a separate line. To mix the two gas streams there can be used for example a binary nozzle. It is sufficient, however, if the separate lines are led at an angle to each other so that a good mixing is guaranteed. The reaction vessel is heated to a temperature of 370° to 440°C., e.g. preferably from 370° or 380°C. up to 430°C., for example to 385° to 415°C.

There is suitably fastened to the end of the reaction vessel a condenser through which the reaction mixture is cooled to about 75°C. This temperature cannot be substantially lowered since otherwise crystalline deposits of 2,6-dichloropyridine would make the condenser impassable. At the same time benzene is continuously introduced into the condenser. It is suitable to use benzene in of an amount of 0.5 to 3.0 liters, preferably 1.5 to 2.5 liters per mole of pyridine. The remaining gas stream is separated in a connected siphon. The liquid two phase mixture is subsequently neutralized with caustic soda solution and the benzene and aqueous phase separated in a separator. The benzene phase after selectively expelling the benzene was worked up by two different methods. In one procedure the chlorination mixture is distilled, suitably operating at a reduced pressure of 50 to 200 Torr, preferably at 90 to 120 Torr and wherein the temperature of the condenser does not go substantially below the melting temperature of 2,6-dichloropyridine (88°C.). Alternatively pure 2,6-dichloropyridine can be isolated in good yield by recrystallization of the crude product freed from benzene. For this purpose the crude mixture is dissolved in a 2 to 10 fold amount of a lower aliphatic alcohol, e.g. methanol, ethanol, isopropanol, propanol or butanol, preferably in a 2 to 4 fold amount of isopropanol with heating and the pure 2,6-dichloropyridine isolated by subsequently cooling and filtering with suction.

In place of benzene there can be used other aromatic hydrocarbons, e.g. toluene, xylene, ethylbenzene, cumene, cymene.

In general there is used a slight excess of chlorine over the stoichiometric amount of for example between 0.1 to 1.5 moles, preferably between 0.5 to 1.0 mole of chlorine per mole of pyridine (to form 2,6-dichloropyridine theoretically 2 moles of chlorine per mole of pyridine). An excess of 0.5 to 1.0 mole of chlorine per mole of pyridine means that there are employed 2.5 to 3 moles of chlorine per mole of pyridine. It is possible to use an excess of chlorine although there is no further improvement produced. The preferred reaction temperature is between 380° and 430°C.

The speed of flow of the components in the reaction vessel is generally between 0.1 and 1.0 meter per second, preferably between 0.2 to 0.5 meter per second.

The residence time in the reaction vessel can generally be short. For example, 2 to 5 seconds are sufficient.

It is also possible to separately heat pyridine, chlorine and steam and then mix them in the reaction chamber. The temperature to which the three components are each preheated can be between 200° and 370°C. for example and can be different for each components. It is merely to be observed that not all three components should possess simultaneously a temperature of 370°C. or higher when entering the reaction chamber since then the temperature in the reaction chamber since then the temperature in the reaction chamber becomes too high. However, two components for example can be preheated for example to 370°C. in case the temperature of the third of component is correspondingly lower. It is possible to regulate the temperature in the reaction chamber by the temperature of the third component added (for example, steam or pyridine vapor or chlorine). The temperature of the third component can be so regulated (generally below 370°C., for example between 100° and 350°C.) so that there is always kept a constant temperature or temperature zone in the reaction chamber.

According to the process of the invention the use of a catalyst is superfluous. There is no blocking by carbon or other resinification products so that it is especially suitable for a continuous process.

The differences between the Taplin U.S. Pat. No. 3,251,848 process and that of the invention can be seen from the following comparison:

According to example 1 of the process of the invention at an excess of chlorine of only 25 percent there is obtained a space-time-yield of 196 grams/liter/hour.

If this process is repeated using the same conditions but replacing the steam by an equal molar amount of carbon tetrachloride (working according to the Taplin patent) there is obtained a space-time-yield of only 68 grams/liter/hour.

Unless otherwise indicated all parts and percentages are by weight.

EXAMPLE 1

A mixture of 2.0 moles of pyridine and 20.0 moles of water were vaporized hourly in a continuous stream, heated to 200°C. and blown into a nickel tube having a diameter of 40 mm, and a length of 900mm through a 2mm diameter inlet tube. Simultaneously there was heated hourly to 300°C. a gas stream of 5.0 moles of chlorine and this was blown into the nickel tube through a second inlet tube having a diameter of 2mm. Inside the nickel tube there was a nickel protective tube having an outer diameter of 13mm for a thermocouple. The free reaction space was 1.0 liters. The nickel reaction was heated by a salt bath to 410°C. Under the working conditions the following temperature profile was observed. At the place of mixing the pyridine steam and chlorine the temperature was 372°C., in the first third of the nickel tube 431°C., in the middle third 422°C., and in the last third 410°C. The residence time in the reaction vessel was 2.3 seconds at a flow velocity of 0.39 meter per second. A condenser was fixed at the outlet of the reactor. The condenser was operated with cooling water at 750°C. The condenser contained an inlet tube through which 1 liter of benzene per hour was introduced. The resulting liquid mixture was freed from the gaseous portion of the reaction product in a connected siphon having a conduit for carrying off gas subsequently introduced into a cooled neutralization vessel and treated at a temperature of 22°C. with 1 liter of 26 percent soda lye per hour. The aqueous and benzene phases were separated in a separator. The benzene phase contained, based on one hour reaction time, 196 grams of 2,6-dichloropyridine as well as 43 grams of 2-chloropyridine.

The space-time-yield was 196 grams of 2,6-dichloropyridine per liter of reaction space per hour. By driving off the benzene and distillation of the remaining product mixture in a column, there were isolated pure 2,6-dichloropyridine and 2-chloropyridine. The 2,6-dichloropyridine boiled at 138° to 142°C. at 100 Torr. The 2-chloropyridine boiled at 106° to 108°C. at 100 Torr. By cooling with cooling water held at 85°C. crystallization in the distillation head was avoided.

The isolation of the 2,6-dichloropyridine can be carried out as follows:

The crude mixture remaining after distilling off the benzone was heated with a 2.5 fold amount of isopropanol, then cooled, filtered with suction and the residue washed with ice cold isopropanol. In this manner for example there was isolated 72 percent of the 2,6-dichloropyridine present in the raw mixture in a purity of 99 percent with a melting point of 85° to 86°C.

EXAMPLE 2

The procedure was the same as in example 1 except there were 1.6 moles of pyridine, 16 moles of water 3.8 moles of chlorine per hour and the reaction tube was heated to 390°C. The flow velocity was 0.29 meter per second, the residence time 3.1. The average reaction temperature was 401°C.

The benzene solution contained 143 grams (per second) of 2,6-dichloropyridine and 42.3 grams (per hour) of 2-chloropyridine.

In example 1 there is used 2.0 moles of pyridine per 20.0 moles of water (steam) and in example 2 there were used 1.6 moles of pyridine per 16 moles of water (steam). Both of these are mathematically the same ratio as 10 moles of steam per mole of pyridine.

What is claimed is:

1. A process for preparing 2,6-dichloropyridine from pyridine and chlorine comprising carrying out the reaction in the presence of steam at a temperature between 370° and 440°C. employing 8 to 14 moles of steam and 2 to 3.5 moles of chlorine per mole of pyridine cooling the reaction product and dissolving it in an aromatic hydrocarbon.

2. A process according to claim 1 wherein the reaction is carried out at an average temperature between 370° and 430°C.

3. A process according to claim 1 wherein reaction product is cooled to below the boiling point of benzene and then is dissolved in benzene.

4. A process according to claim 3 wherein the benzene is used in an amount of 0.5 to 3.0 liters per mole of pyridine.

5. A process according to claim 4 including the steps of distilling off the benzene and thereafter distilling off the 2,6-dichloropyridine.

6. A process according to claim 1 wherein there are employed 2.5 to 3 moles of chlorine per mole of pyridine.

7. A process according to claim 1 wherein there are employed 10 moles of steam per mole of pyridine.

8. A process according to claim 6 wherein the reaction is carried out at an average temperature between 370° and 430°C.

9. A process according to claim 1, wherein the aromatic hydrocarbon is toluene, xylene, ethylbenzene, cumene or cymene.

* * * * *